(12) United States Patent
Power

(10) Patent No.: US 10,477,855 B2
(45) Date of Patent: Nov. 19, 2019

(54) RODENT BAIT STATION HAVING A COUNTING MECHANISM

(71) Applicant: Marc Daniel Power, Coral Springs, FL (US)

(72) Inventor: Marc Daniel Power, Coral Springs, FL (US)

(*) Notice: Subject to any disclaimer, the term of this patent is extended or adjusted under 35 U.S.C. 154(b) by 188 days.

(21) Appl. No.: 15/795,460

(22) Filed: Oct. 27, 2017

(65) Prior Publication Data

US 2019/0124913 A1 May 2, 2019

(51) Int. Cl.
*A01M 25/00* (2006.01)
*A01M 31/00* (2006.01)

(52) U.S. Cl.
CPC ........ *A01M 25/004* (2013.01); *A01M 31/002* (2013.01)

(58) Field of Classification Search
CPC .......................... A01M 25/002; A01M 25/004
See application file for complete search history.

(56) References Cited

U.S. PATENT DOCUMENTS

| | | | | |
|---|---|---|---|---|
| 6,865,843 B1* | 3/2005 | Jordan, Sr. | ............ | A01M 23/12 43/139 |
| 2010/0031557 A1* | 2/2010 | Vickery | ............ | A01M 25/004 43/131 |
| 2010/0134301 A1* | 6/2010 | Borth | ............ | A01M 1/026 340/573.2 |
| 2013/0145801 A1* | 6/2013 | Covington | ............ | A01M 25/004 70/158 |
| 2017/0035041 A1* | 2/2017 | Othon | ............ | A01M 23/20 |
| 2017/0360026 A1* | 12/2017 | Zirkle | ............ | A01M 25/004 |

* cited by examiner

*Primary Examiner* — Richard G Davis
(74) *Attorney, Agent, or Firm* — Tiffany C. Miller; Inventions International Inc.

(57) ABSTRACT

A rodent bait station having a counting mechanism configured to monitor the number of rodents entering the bait chamber of a rodent bait station. The housing has a counting mechanism in communication with the entrance of at least one bait chamber opening. A sensor is in communication with the counting mechanism. The counting mechanism can be mechanically actuated or electronically activated when the sensor detects a rodent entering through the bait chamber of the bait station. The bait chamber has at least one bait rod having an end that is hingedly connected to an inner wall of the bait chamber. A resilient member is in communication with the bait rod to position the bait rod in a substantially horizontal orientation when the housing lid is closed and to position the bait rod in a substantially vertical orientation when the housing lid is opened.

8 Claims, 8 Drawing Sheets

RODENT BAIT STATION HAVING A COUNTING MECHANISM

BACKGROUND OF THE INVENTION

1. Field of the Invention

This invention relates, generally, to a rodent bait station. More particularly, it relates to a bait station having a counting mechanism in communication with a sensor configured to monitor and display the number of times a rodent enters the bait chamber of a bait station.

2. Background Art

Currently, rodent management systems can include a rodent bait station having a housing. The housing often has a bait chamber that retains bait including, but not limited to, blocks of bait or soft bait. Bait stations in today's market are configured to enable rodents including, but not limited to, pests, mice, or rats, to enter a bait station through an opening of the housing, then to enter through a second opening within the housing to access a bait chamber to eat the bait, and then to leave the housing. It would be more desirable for a user including, but not limited to, a rodent control service professional to know approximately how many rodents have entered the bait chamber of a rodent bait station. This information could help the effectiveness of a rodent control management program with identifying high rodent traffic locations and faciliting in the replacement of bait and the placement of rodent bait stations within those high rodent traffic areas during a treatment. As a result, more rodents would be eliminated. Thus, there is a need for a rodent bait station to have a counting mechanism configured to keep count and display the number of times a rodent enters a bait chamber of a rodent bait station.

Rodent bait stations currently being used in the field of pest control have removable bait rods. The bait is placed on at least one rod removably connected to an inner wall surface of the housing including, but not limited to, a side wall or the housing floor. These removable bait rods are configured to be retained within the bait chamber of a rodent bait station. The baited rods are slid into a pair of opposing retaining recesses which suspend the bait. A user will typically need to replace the bait on the rods during the course of the rodent control management program. However, a problematic issue currently known to rodent control service professionals that monitor these bait stations is that these bait rods become removed from their retaining recesses. For example, when a mouse is eating the bait from the bait rod, the force of the mouse pushing against the bait rod can dislodge the bait rod from the housing. It has been known for some rodents to drag both the bait and the bait rod out from the bait chamber and from the bait housing. This results in a missing bait rod and the need for replacement parts which can be costly to keep replacing. Thus, there is a need for a more effective and efficient way to bait a bait rod other than completely removing the bait rod from the bait chamber.

However, in view of the prior art considered as a whole at the time the present invention was made, it was not obvious to those of ordinary skill in the pertinent art how the identified needs could be fulfilled.

SUMMARY OF THE INVENTION

The long-standing but heretofore unfulfilled need for a rodent bait station having a counting mechanism configured to monitor the number of rodents entering the bait chamber of a rodent bait station. The rodent bait station has a housing fastened to an anchoring structure with at least one fastener. The housing of the bait station has at least one housing opening. The housing has a bait chamber having at least one bait chamber opening. The housing has a counting mechanism in communication with the entrance of at least one bait chamber opening. A sensor is in communication with the counting mechanism. The counting mechanism can be mechanically actuated or electronically activated when the sensor detects an event including, but not limited to, the presence of a rodent entering through the opening of the bait chamber. Upon activation of the sensor, the counting mechanism will record the frequency of the event. A lid is hingedly connected to the housing. The bait chamber has at least one bait rod having an end that is hingedly connected to an inner wall of the bait chamber. A resilient member is in communication with the bait rod and is configured to position the bait rod in a substantially horizontal orientation when the housing lid is closed and to position the bait rod in a substantially vertical orientation when the housing lid is opened, which also includes improvements that overcome the limitations of prior art rodent bait stations is now met by a new, useful, and non-obvious invention.

In a preferred embodiment, the novel rodent bait station has a housing. The housing is configured to be fastened to an anchoring surface with a fastener. An anchoring surface includes, but is not limited to, a piece of concrete, a weight, a brick, a floor, or the ground. The fastener includes, but is not limited to, a screw, a nail, or an interlocking nut and bolt. The housing has at least one opening. The housing has a bait chamber. The bait chamber is where the bait is retained by a bait rod. In order for a rodent to get to the bait chamber, the rodent needs to enter through an opening of the housing of the bait station first, walk down a hallway of the housing, and then enter the bait chamber through a bait chamber opening. The bait chamber can have at least one bait chamber opening or a plurality of bait chamber openings.

In a preferred embodiment, the novel rodent bait station has a counting mechanism in communication with at least one bait chamber opening of the bait chamber. The counting mechanism has a sensor. It is within the scope of this invention for the sensor to detect include, but not be limited to, motion of a rodent, weight of a rodent, or heat generated from a rodent. The sensor is configured to detect the presence of a rodent passing through at least one bait chamber opening of the bait chamber. The sensor will communicate with the counting mechanism mechanically, wirelessly, or electrically. The sensor is configured to retain data associated with the number of times the sensor detects a rodent passing through at least one bait chamber opening of the bait chamber. The data can be stored in including, but not limited to, an electronic database, or within a counter that displays the count value to a user through a viewable window. It is within the scope of this invention for a mechanical actuating counter to include, but not be limited to, a ratcheting mechanism, a turnstile, or revolutions.

In another embodiment, the novel rodent bait station has a housing having a lid. The lid is hingedly connected to the housing.

In yet another embodiment, the novel rodent bait station has at least one bait rod. At least one bait rod has a first end located opposite a second end. Although a rodent bait station can have any amount of bait rods connected thereto, it is an important object of this current invention for two hingedly pivotable bait rods to be opposed to each other. The first end of at least one bait rod is hingedly connected to an inner surface of the bait chamber. The second end of at least one bait rod can have a shape capable of piercing through bait. The bait rod can be hingedly pivoted to a substantially horizontal orientation when the lid of the housing is closed, thereby, positioning the bait to be set within the bait chamber and ready to be eaten by a rodent within the bait chamber. The bait rod can be hingedly pivoted to a substantially vertical orientation when the lid of the bait station is opened. This makes it easier for a user to replenish the bait rod with new bait. The second end of at least one bait rod is configured to receive bait. It is within the scope of this invention for the bait rod to have an end portion similar to a Phillips Head rounded tip to make it easier for the bait rod to pierce through bait such as soft bait.

In another embodiment, the novel rodent bait station has a housing having a resilient member. It is within the scope of this invention for a resilient member to include, but not be limited to, a spring or a slidably traversing member. The resilient member is in communication with the first end of at least one bait rod, whereby, at least one bait rod is positioned in a substantially horizontal orientation when the lid of the housing is closed and at least one bait rod is positioned in a substantially vertical orientation when the lid of the housing is opened.

In another embodiment, the novel rodent bait station has a counting mechanism that is electronically activated. The counting mechanism is in communication with a weight sensor, whereby, the weight sensor is configured to activate the counting mechanism when a change of weight occurs when a rodent enters the bait chamber through at least one bait chamber opening. The weight sensor can be a scale integrated into the flooring of the bait station housing. When the rodent stands on the scale, the scale will detect the change in weight and communicate to the counting mechanism that a rodent has entered through the opening of the bait chamber. The counting mechanism will retain this count within an associated database and/or display the count value in a viewable count window on the housing. An electronic database may communicate with an application on a wireless device, a mobile device, a wired device, or a computer. For example, a user could check their smart phone app. or a computer to monitor the rodent traffic through the opening of the bait chamber.

In another embodiment, the novel rodent bait station counting mechanism is in communication with a motion detector. The motion detector includes, but is not limited to, a laser, a light, a video recorder, or a camera. A motion detector detects motion of a rodent entering the bait chamber through at least one bait chamber opening. When motion is detected, the sensor communicates with the counting mechanism to store the count value within a database. The database can be in external communication with the rodent bait station. The database can be integrally formed within the housing of the bait station.

In another embodiment, the novel rodent bait station counting mechanism is mechanically actuated. In a preferred embodiment, at least one lever can protrude from a wall of the housing. The lever is oriented so that when a rodent passing through the opening of the bait chamber will make contact with the lever and depress the lever. The force of the rodent passing through the opening of the bait chamber will depress the lever and will actuate the counting mechanism. In a preferred embodiment, each time the lever is depressed by a rodent, the counting mechanism will ratchet one time or will revolve at least a portion of a revolution, or will depress another button to initiate a count value. The counting mechanism can be connected with a count value viewer window. In an alternate embodiment, the lever can be a turnstile configured to revolve when a rodent passes through the opening of the bait chamber. The counting mechanism is in communication with the turnstile and has a revolving mechanism that when monitored will reveal the associated rodent visits with the number of revolutions made by the counting mechanism. The number of revolutions can be viewed through a numerical counter viewing window that is in communication with the counting mechanism.

In another embodiment, the novel rodent bait station counting mechanism has a rod. At least one protrusion extends from a rod. At least one protrusion is located at the bait chamber opening, whereby, at least one protrusion is configured to ratchet an actuating mechanism in communication with the rod when the force of a rodent is applied to at least one protrusion when the rodent is entering the bait chamber through at least one bait chamber opening. It is within the scope of this invention for a protrusion or for a lever to protrude from any wall surface of the housing, the bait chamber, or from the lid of the rodent bait station. The protrusion needs to substantially block the opening of the bait chamber to the point that any rodent passing through the bait chamber opening will be required to contact the protrusion and to depress the protrusion, thereby, actuating the counting mechanism by including, but not limited to, depressing, ratcheting or revolving.

In another embodiment, the novel rodent bait station has a housing. The housing has a bait chamber. The bait chamber has at least one bait chamber opening. The bait chamber can have an opening on both ends of the rodent bait station. The housing has a counting mechanism in communication with at least one bait chamber opening. The counting mechanism has a sensor configured to detect the presence of a rodent passing through at least one bait chamber opening. The housing compartments are concealed with a lid. The lid is connected to the housing. The lid can be hingedly connected to the housing. The rodent bait station has at least one bait rod configured to receive bait.

In another embodiment, the novel rodent bait station has at least one bait rod having a first end located opposite a second end. The first end of at least one bait rod is hingedly connected to an inner surface of the bait chamber. The second end of at least one bait rod is configured to receive bait. When the lid of the housing is oriented in a closed orientation, the bait rods are positioned in a substantially horizontal orientation. When the lid of the housing is oriented in an open configuration, the resilient member of the bait rod orients the bait rod in substantially vertical alignment. In a preferred embodiment of this invention, a housing has two opposing bait rods hingedly connected to an inner wall surface of the bait chamber. This arrangement maximizes the baiting space during a treatment and enables quick rebaiting of the bait rods when the lid is opened by a user.

In another embodiment, the novel rodent bait station has a resilient member. The resilient member is in communication with a first end of at least one bait rod, whereby, at least one bait rod is positioned in a substantially horizontal orientation when the lid of the housing is closed and the bait rod is positioned in a substantially vertical orientation when the lid of the housing is opened. The bait rod can be connected to a hinge, whereby, the hinged bait rod is connected to a spring, allowing the bait rod to pivot from a horizontal orientation to a vertical orientation. The bait rod can be connected to an end of a resilient member, including, but not limited to, a spring, whereby, the spring is retained within a spring housing connected to a surface of the bait chamber. The spring housing has an opening configured to guide the spring as it slidably traverses the spring housing opening as it is oriented from a horizontal orientation to a vertical orientation and from a vertical orientation to a horizontal orientation. The bait rod is configured to pivot when the lid of the housing is opened and closed. A spring having an end connected to a bait rod can be depressed into the spring housing and can slidably traverse down the spring housing opening of the spring housing, thereby, orienting the bait rod to have a substantially horizontal orientation in relation to the bait chamber. The force of the closed lid of the housing presses down on the bait rod and depresses the spring within the spring housing. When the housing lid is opened, the spring is released from the spring housing or slidably traverses up the opening of the resilient member housing, thereby, pivoting the bait rod in a vertical orientation in relation to the bait chamber.

In another embodiment, the novel rodent bait station has a sensor in communication with a counting mechanism. The sensor is electronically activated.

In another embodiment, the novel rodent bait station has a counting mechanism in communication with a weight sensor. The weight sensor is configured to activate the counting mechanism when a change of weight occurs when a rodent enters the bait chamber through at least one bait chamber opening. In an example, if the novel rodent bait station having a counting mechanism has counted 100 rodents entering a bait chamber during a one week time period, that information would suggest including, but not limited to, the placement of additional rodent bait stations in that high activity location or that the bait chamber needs to be serviced more frequently to replace the bait to accommodate the high volume of rodents. In contrast, if the novel rodent bait station having a counting mechanism has counted 2 rodents entering a bait chamber during a one week time period, that information may suggest the relocation of the rodent bait station. The counting mechanism counts the number of times a rodent enters the bait chamber.

In yet another embodiment, the novel rodent bait station has a motion sensor including, but not limited to, a laser, a camera, a video recorder, or a light. The motion detector detects motion of a rodent entering the bait chamber through at least one bait chamber opening. Sometimes debris such a leaves and trash may enter the rodent bait station housing. Although a sensor can be placed at any opening of the housing, it is a preferred embodiment of the present invention for the sensor to be located at the opening of the bait chamber. The bait chamber is more centrally located within the housing of the rodent bait station. A rodent would have to travel down a hallway of the housing to gain entry to the bait chamber. This is why a sensor located at the opening of the bait chamber is more ideal, as to not detect and count trash and other debris that might have entered the housing from wind. Additionally, it has been known for small animals including, but not limited to, snails or lizards to enter a rodent bait station for shelter from the elements. These creatures do not intend to feed on the bait, so they rarely make it to the bait chamber. A sensor located at the entrance of the bait chamber would not miscount these smaller creatures unless if they make their way through the bait chamber, which is rare. Further, it would be more difficult for trash or other debris to depress a lever at the entrance of the bait chamber opening.

In yet another embodiment, the novel rodent bait station has a housing. The housing has a bait chamber. The bait chamber has at least one bait chamber opening. The housing has a lid hingedly connected to the housing. At least one bait rod is configured to receive bait. At least one bait rod has a first end located opposite a second end. The first end of at least one bait rod is hingedly connected to an inner surface of the bait chamber. The second end of at least one bait rod is configured to receive bait. A resilient member is in communication with the first end of the bait rod, whereby, at the bait rod is positioned in a substantially horizontal orientation when the lid of the housing is closed and the bait rod is positioned in a substantially vertical orientation when the lid of the housing is opened.

In yet another embodiment, the novel rodent bait station has a housing configured to be fastened to an anchoring surface with a fastener.

In yet another embodiment, the second end of the one bait rod has a shape capable of piercing through bait.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
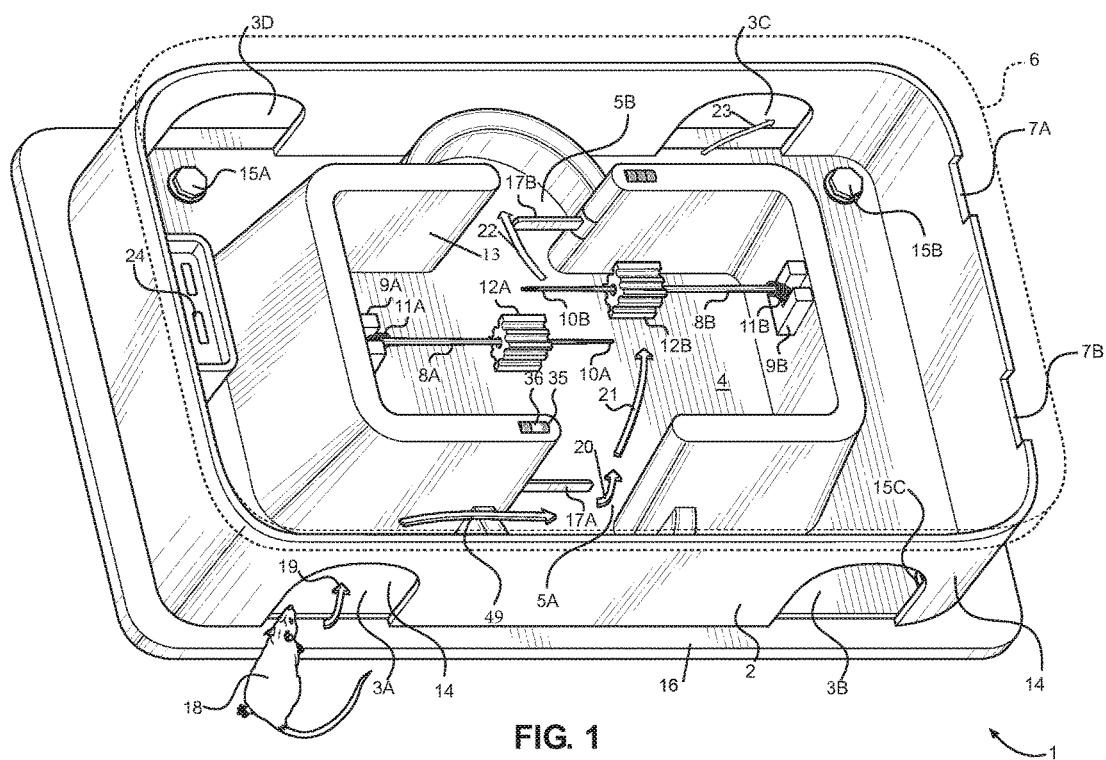
FIG. 1 is a top perspective view of the novel rodent bait station having at least one lever protruding from the bait chamber wall at the opening of the bait chamber. The bait rods are hingedly connected to an inner wall surface of the bait chamber.
Figure 6:
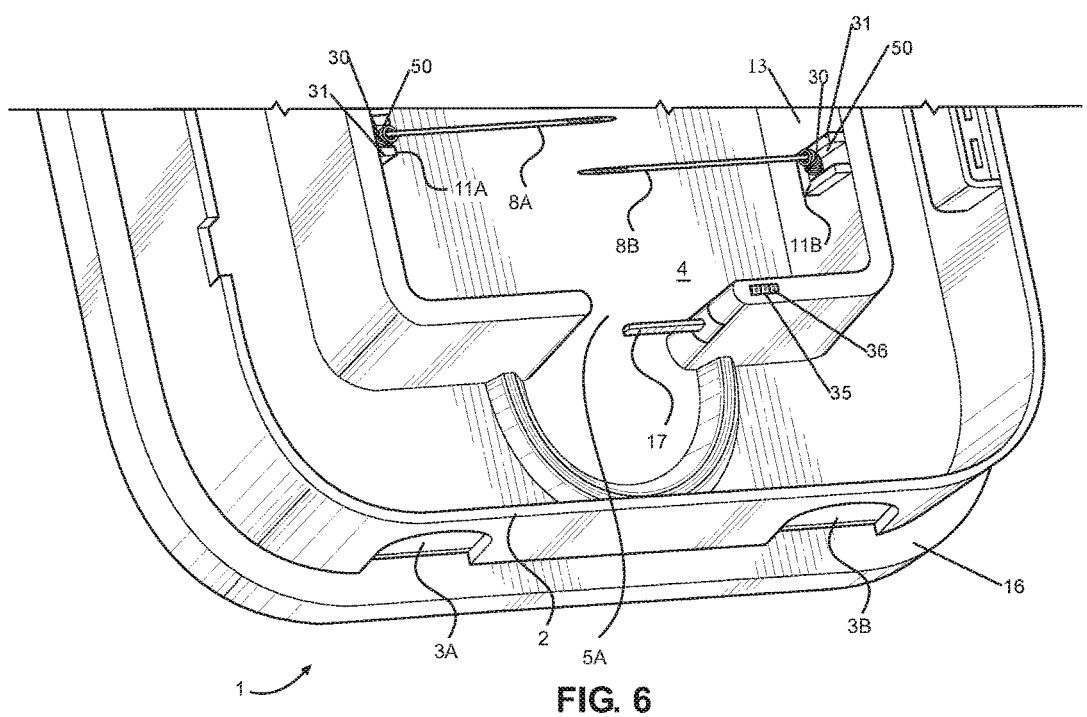
FIG. 6 is a partial top perspective view of an alternate embodiment of the novel rodent bait station having a single lever protruding from an opening of the bait chamber.
Figure 7:
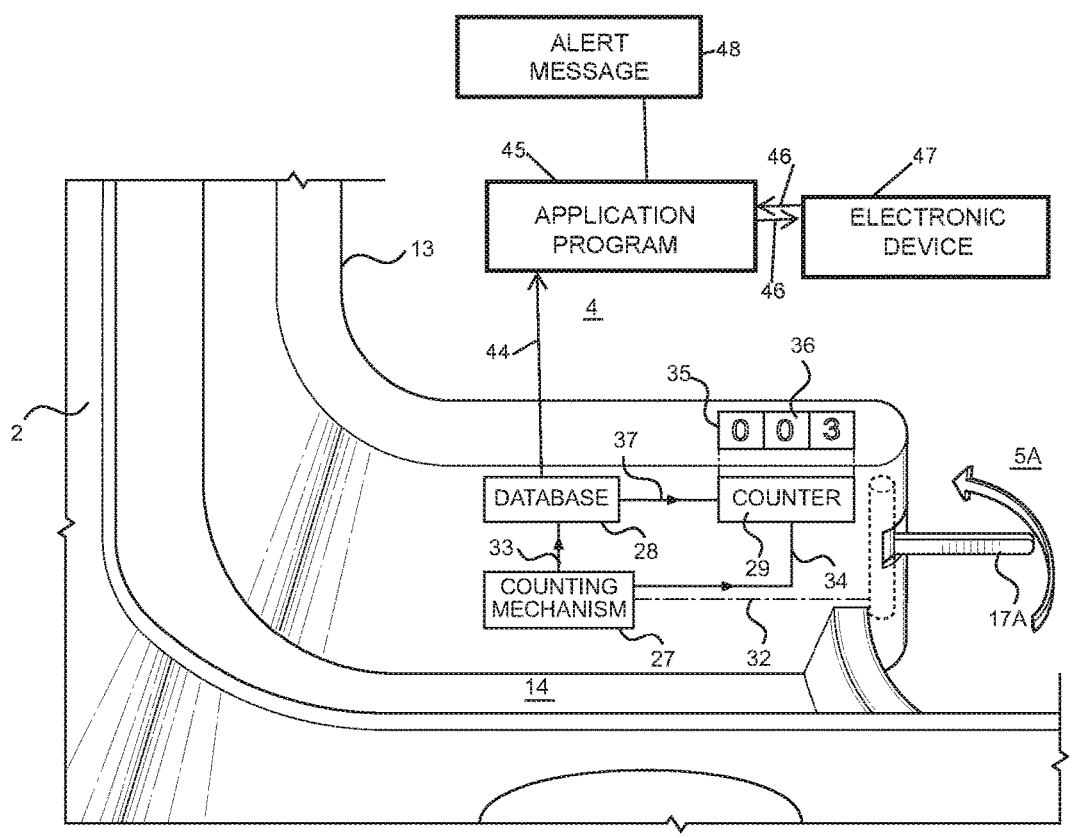
FIG. 7 is a partial perspective view of the mechanically actuated counting mechanism of the novel rodent bait station.

In a general embodiment as depicted in FIG. 1, the novel rodent bait station 1 has housing 2. Housing 2 has primary opening 3A, secondary opening 3B, tertiary opening 3C, quaternary opening 3D. Housing 2 has hallway 14 (FIGS. 1 and 7). Housing 2 has bait chamber 4. Bait chamber 4 has primary opening 5A and secondary opening 5B. A sensor is positioned at the bait chamber openings 5A and 8B. The sensor can be a single lever 17 (FIG. 6), a plurality of levers 17A and 17B (FIG. 1), a turnstile (not shown), a weight sensor (not shown), a motion detector (not shown), a camera (not shown), a video recorder (not shown), a scale (not shown), at least one protrusion 17, or a revolving door (not shown). Bait station 1 can have more than one type of sensor in communication with counting mechanism 27 (FIG. 7). Bait chamber 4 (FIGS. 1, 2, 3A, 4, 6-10) has bait chamber openings 5A (FIGS. 1, 2, 3A, 4, and 6-10) and 5B (FIG. 1). Bait chamber 4 has an inner wall surface 13 (FIGS. 1 and 6-7).

FIG. 7 shows at least one lever 17A in communication with 32 counting mechanism 27. The communication 32 can be an electrical wired connection, a wireless connection, or any mechanically actuated connection including, but not limited to revolving, ratcheting, or the depressing of a button for each count. The counting mechanism 27 may be in communication 33 with data base 28. The communication 33 can be any mechanical connection, an electrical wired connection, or a wireless connection. Database 28 can be external to rodent bait station 1, it can be located within housing 2, or it may be bypassed. In particular, counting mechanism 27 could be connected 34 with counter 29 directly or counting mechanism 27 could be in electrical communication with a database 28. In an embodiment, database 28 can be in communication with 37 counter 29 which displays indicia 36 (FIGS. 1, 6-7) being count values through display window 35. Display window 35 (FIGS. 1, 6-7) can be located on any surface of housing 2.

FIG. 7 illustrates that database 28 configured to retain data associated with the number of times said counting mechanism is activated. For example, when a mouse passes through bait chamber opening 15A, lever 17A will be depressed or ratcheted or any other type of mechanical actuation the counting mechanism is capable of performing. Perhaps, a ratcheting mechanism has ratcheted one notch. Perhaps a turnstile has made one revolution. This actuation is monitored and retained within database 33 or can be interpreted and displayed by counter 29.

FIG. 7 further depicts another embodiment in which database 28 in electrical communication 44 with application program 45. Application program 45 is in electrical communication with electronic device 47. Application program 45 is configured to be monitored by a user through said electronic device. In particular, a user can use any electronic device 47 including, but not limited to, a computer, a smart phone, a tablet, or an iPad to open the rodent bait station application program 45. Application program 45 will is capable of alerting a user when sensor 17A of rodent bait chamber 4 has activated counting mechanism 27. This means that alert message 48 will indicate to a user when a rodent has entered the bait chamber of the rodent bait station. Application program 45 is capable of retaining and displaying data in relation to the rodent bait station including, but not limited to, the number of times a rodent enters the bait chamber, the length time the rodent bait station has been at a particular location, location information, or bait consumption data.

It is within the scope of this invention for counting mechanism 27 to be directly connected 34 to counter 29. Counter 29 can be viewed by a user through viewing window 35. The database 28 or counting mechanism 27 may communicate with counter 29 to display indicia being count values 36 on including, but not limited to, a mechanical counter 29 viewable through viewing window 35 of housing 2 (FIGS. 1 and 7). Indicia count value 36 can be displayed on an electronic display 47 through application program 45. The count value 36 corresponds to the amount of times a rodent 18 (FIG. 1) passes through 20 (FIG. 1) the opening 5A of bait chamber 4. For example, if the count value 36 shows the value 025, the 025 indicated that lever 17A has ratcheted, depressed, or activated the counting mechanism 27 twenty five times, therefore, it can be accurate to say that a rodent had generated the force and applied the force to lever 17A to actuate counting mechanism 27 to record a count.

FIGS. 1-3A, 4-5, and 8-10 illustrate rodent bait station 1 having a lid 6 connected to housing 2 with at least one hinge 7A and 7B. It is within the scope of this invention for lid 6 to be connected with housing 2 with a single hinge 7. FIG. 1 shows bait chamber 4 having inner wall surface 13. Primary bait rod 8A has a primary end 9A located opposite secondary end 10A. Primary end 9A is connected to inner wall surface 13 of bait chamber 4 with hinge 11A. Secondary end 10A of bait rod 8A pierces through bait 12A. Secondary bait rod 8B has a primary end 9B located opposite secondary end 10B. Secondary end 9B is connected to inner wall surface 13 of bait chamber 4 with hinge 11B. Secondary end 10B of bait rod 8B pierces through bait 12B.

FIG. 1 show housing 2 having fasteners 15A-15C. The fasteners connect housing 2 with anchoring structure 16 (FIGS. 1-3A, 4-6, and 8-10). Housing 2 can have a locking mechanism 24 (FIGS. 1 and 5) including, but not limited to, a combination lock, a digital lock, a lock and key (FIG. 5), a fingerprint lock, or a latch.

FIG. 1 illustrates rodent 18 entering 19 bait station 1 through opening 3A of housing 2. Rodent 18 walks down 49 hallway 14. Rodent 18 enters 20 bait chamber 4 through opening 5A and depresses levers 17A and 17B. Rodent 18 eats 21 bait 12B. Rodent 18 leaves 22 bait chamber 4 through opening 5B. Rodent 18 walks 23 down hallway 14 and exits housing 2 through opening 3C.

Figure 2:
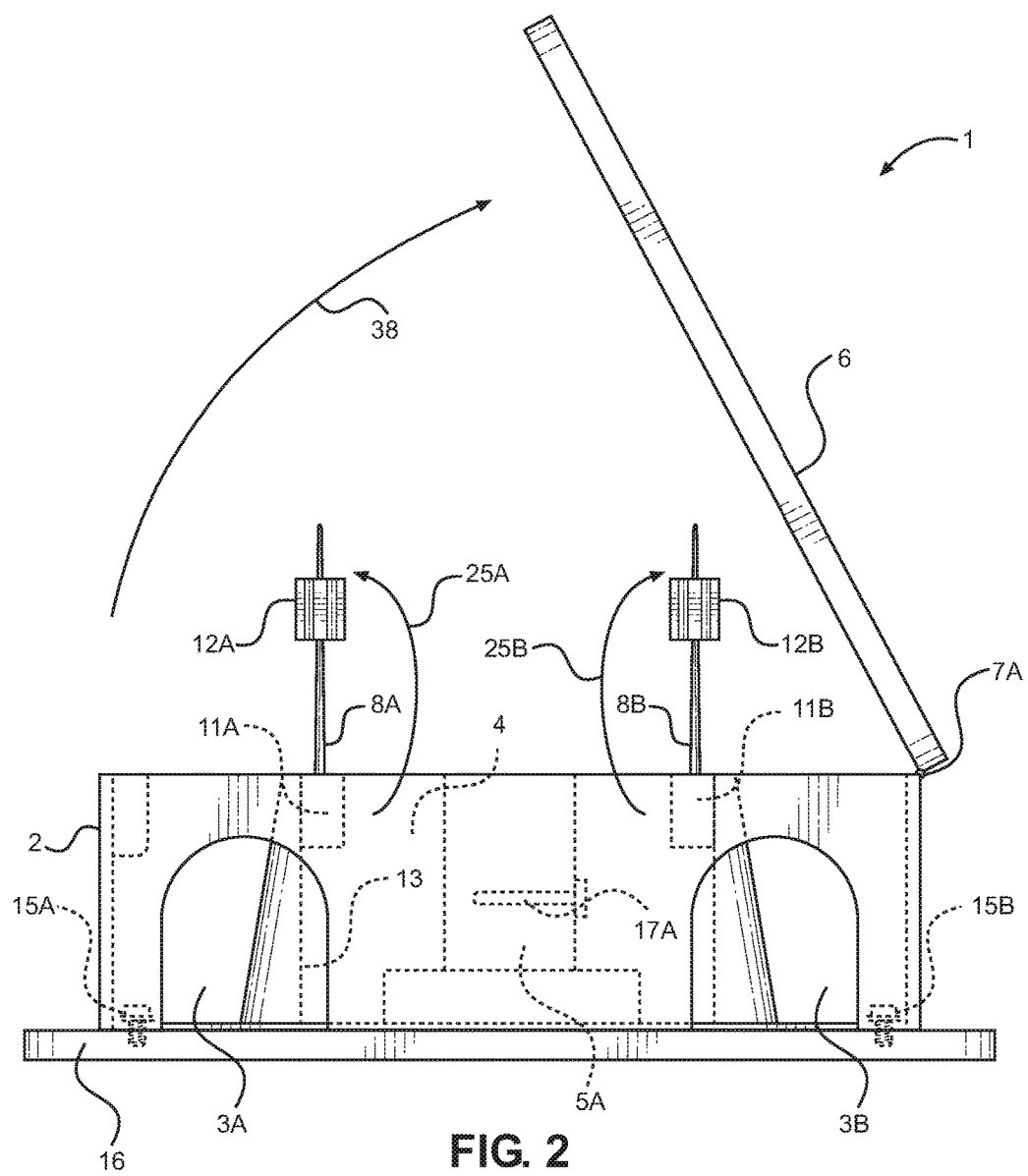
FIG. 2 is a side cut-away view of the novel rodent bait station having the bait rods positioned in a substantially vertical orientation when the lid of the housing is opened. The bait rods are hingedly connected to an inner wall surface of the bait chamber.
Figure 3A:
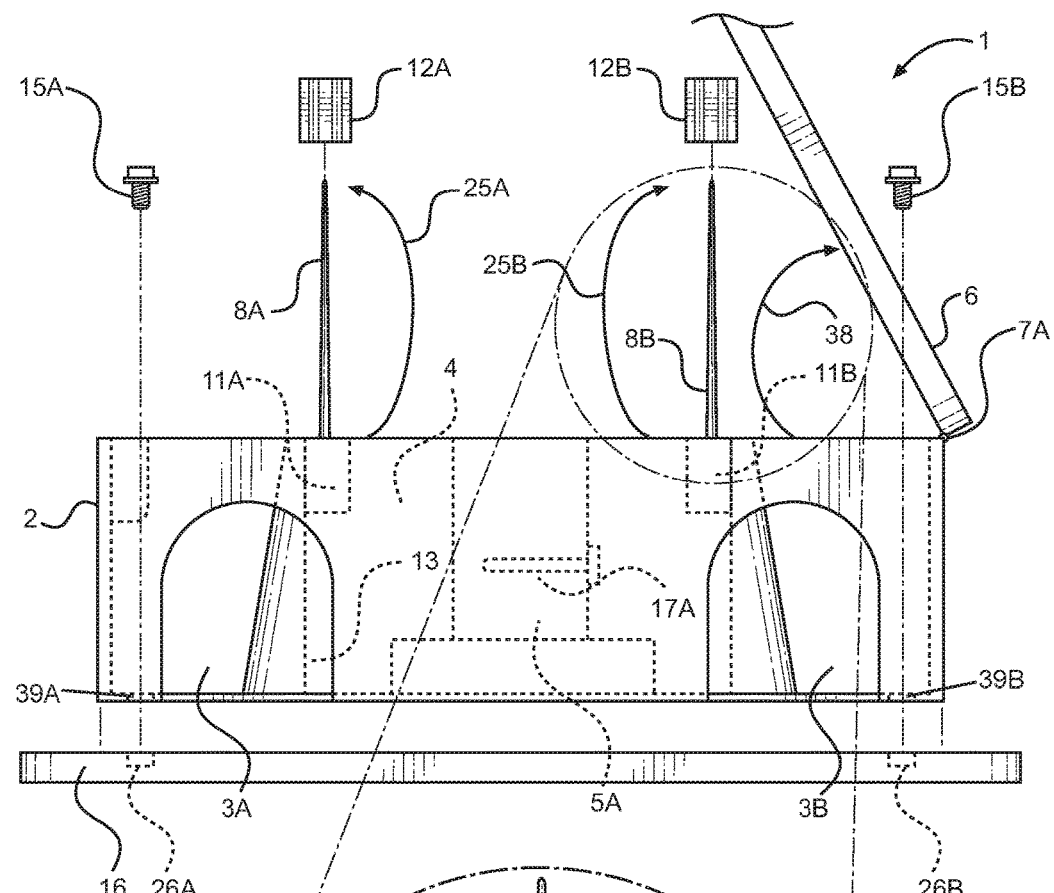
FIG. 3A is an exploded view of an alternate embodiment of the novel rodent bait station having the bait rods connected to a resilient member and positioned in a substantially vertical orientation when the lid of the housing is opened. The housing is connected to an anchoring surface with fasteners.

FIGS. 2 and 3A show bait station 1 having housing 2. Housing 2 has openings 3A and 3B. Fasteners 15A and 15B connect housing 2 with anchoring structure 16. In this embodiment, bait rods 8A and 8B are connected to an inner wall surface 13 of bait chamber 4 with hinges 11A and 11B. At least one lever 17A can protrude from opening 5A of bait chamber 4. Lid 6 is in an open configuration 38 and bait rods 8A and 8B are positioned in a substantially vertical orientation 25A and 25B in relation to housing 2. Bait 12A can now be easily pierced by bait rod 8A and bait 12B can be pierced by bait rod 8B.

Figure 3B:
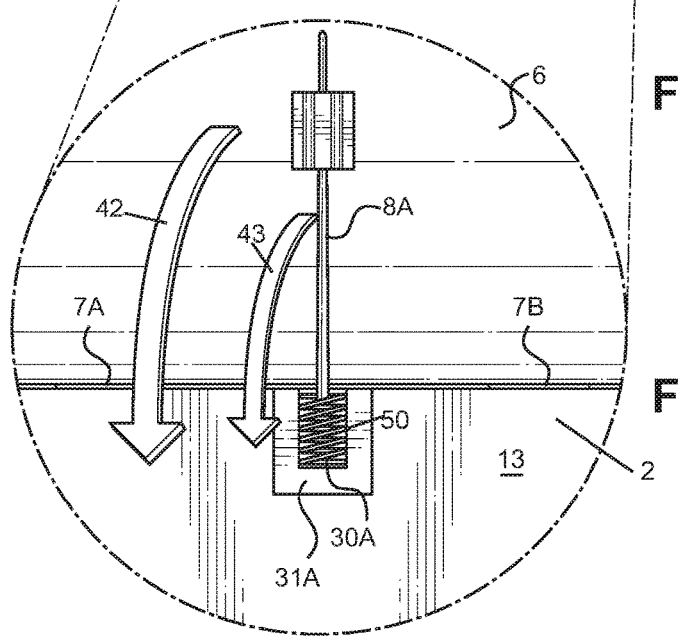
FIG. 3B is a close-up perspective view of the bait rods having an end hingedly connected to an inner wall surface of the bait chamber, whereby, the end of the bait rod has a resilient member retained within a housing.

FIG. 3B illustrates an embodiment of bait rod 8a being connected to inner wall surface 13. Lid 6 is connected to housing 2 with hinges 7A and 8B. Although bait rod 8A can be connected to housing 2 with standard hinges illustrated in 7A and 7B, bait rod 8A can be connected with a resilient member 30. Resilient member can be a spring 30 (FIG. 3B) retained within housing 31 or a ball (not shown) that slidably traverses the length of housing 31. The housing 31 has an opening 50 (FIGS. 3B, 6, 8-10) allowing bait rods 8A-8B having resilient member 30 to be oriented from a horizontal orientation to a vertical orientation 25A and 25B and from a vertical orientation to a horizontal orientation 43 (FIGS. 3B and 9).

It is within the scope of this invention for at least one fastener 15 to be used or a plurality of fasteners to be used to anchor housing 2 to anchoring structure 16. A second fastener 15B can be inserted through opening 39B and then through opening 26B to secure housing 2 to anchoring structure 16.

In the embodiment illustrated in FIG. 3B, bait rod 8A is connected to resilient member 30A. Resilient member 30A is retained within resilient member housing 31A. Resilient member housing 31A is connected to an inner wall surface 13 of bait chamber 4. When lid 6 is raised to open configuration 38 resilient member 30 is released from depression. When lid 6 is lowered 42 (FIGS. 3B and 9) to close housing 2, resilient member 30 is depressed within resilient member housing 31 or is depresses in a manner in which at least a portion of resilient member 30 protrudes from opening 50 of housing 31. This creates a hands free rebaiting process because a user does not have to physically reposition the bait rods 8 to an ideal bait piercing level. The spring mechanism will automatically raise the bait rods 8A and 8B to a vertical orientation 25 for ideal bait piercing. FIG. 3A further shows lever 17A protruding from opening 5A of bait chamber 4. Lid 6 is in an open configuration 38 and bait rods 8A and 8B are positioned in a substantially vertical orientation 25A and 25B in relation to housing 2. Bait 12A can now be easily pierced by bait rod 8A and bait 12B can be pierced by bait rod 8B.

Figure 4:
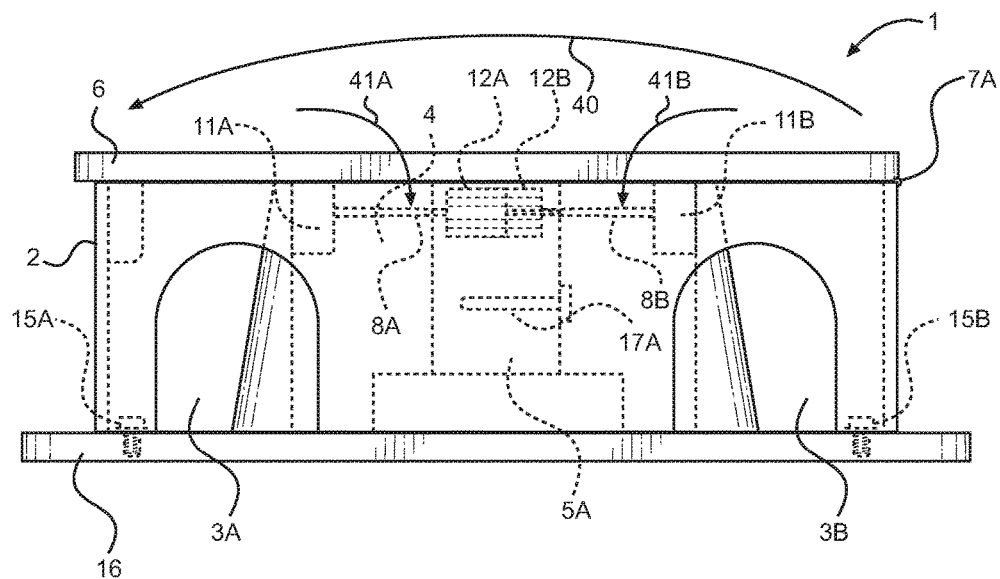
FIG. 4 is a side cut-away view of the novel rodent bait station having the bait rods positioned in a substantially horizontal orientation when the lid of the housing is closed.

FIG. 4 illustrates bait station 1 having housing 2. Housing 2 has openings 3A and 3B. Fasteners 15A and 15B connect housing 2 with anchoring structure 16. In this embodiment, bait rods 8A and 8B are connected to an inner wall surface 13 of bait chamber 4 with hinges 11A and 11B. Lever 17A protrudes from opening 5A of bait chamber 4. Lid 6 is in a closed configuration 40 and bait rods 8A and 8B are positioned in a substantially horizontal orientation 41A and 41B in relation to housing 2. Bait 12A and 12B can now be easily eaten by a rodent (not shown) within bait chamber 4.

Figure 5:
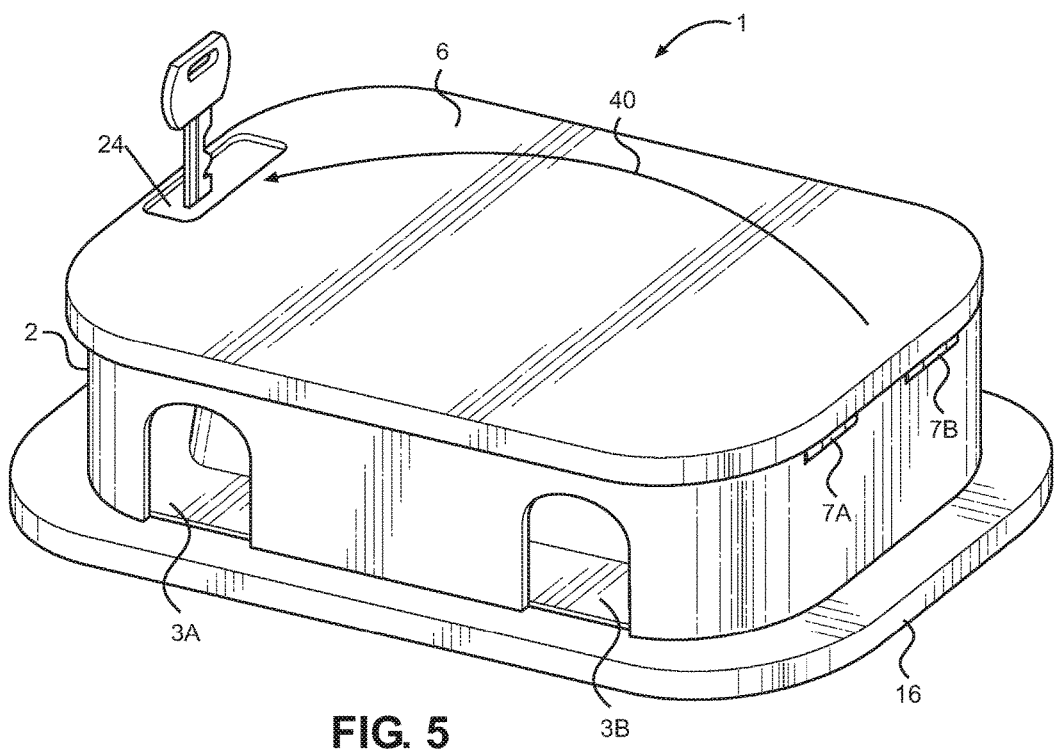
FIG. 5 is a perspective view of the novel rodent bait station having a locking mechanism and having the lid positioned in a closed orientation.

FIG. 5 depicts housing 2 connected to anchoring structure 16. Housing has openings 3A and 3B. Lid 6 is in a closed configuration 40.

FIG. 6 illustrates an embodiment of novel rodent bait station 1 having housing 2. Housing 2 has openings 3A and 3B. Housing 2 has bait chamber 4. Bait chamber opening 5A is in association with lever 17. Lever 17 protrudes from a wall surface of the bait chamber and is configured to actuate a counting mechanism (FIGS. 1 and 7) when a rodent passes through bait station opening 5A. Bait rods 8A and 8B can be connected to an inner wall surface 13 of bait chamber 4 with hinges 11A and 11B being a standard hinge (not shown) or with a resilient member 30 retained within housing 31 having opening 50. It is within the scope of this invention for bait rods 8A and 8B to have an end capable of piercing through any bait including, but not limited to, soft bait or brick bait.

Figure 8:
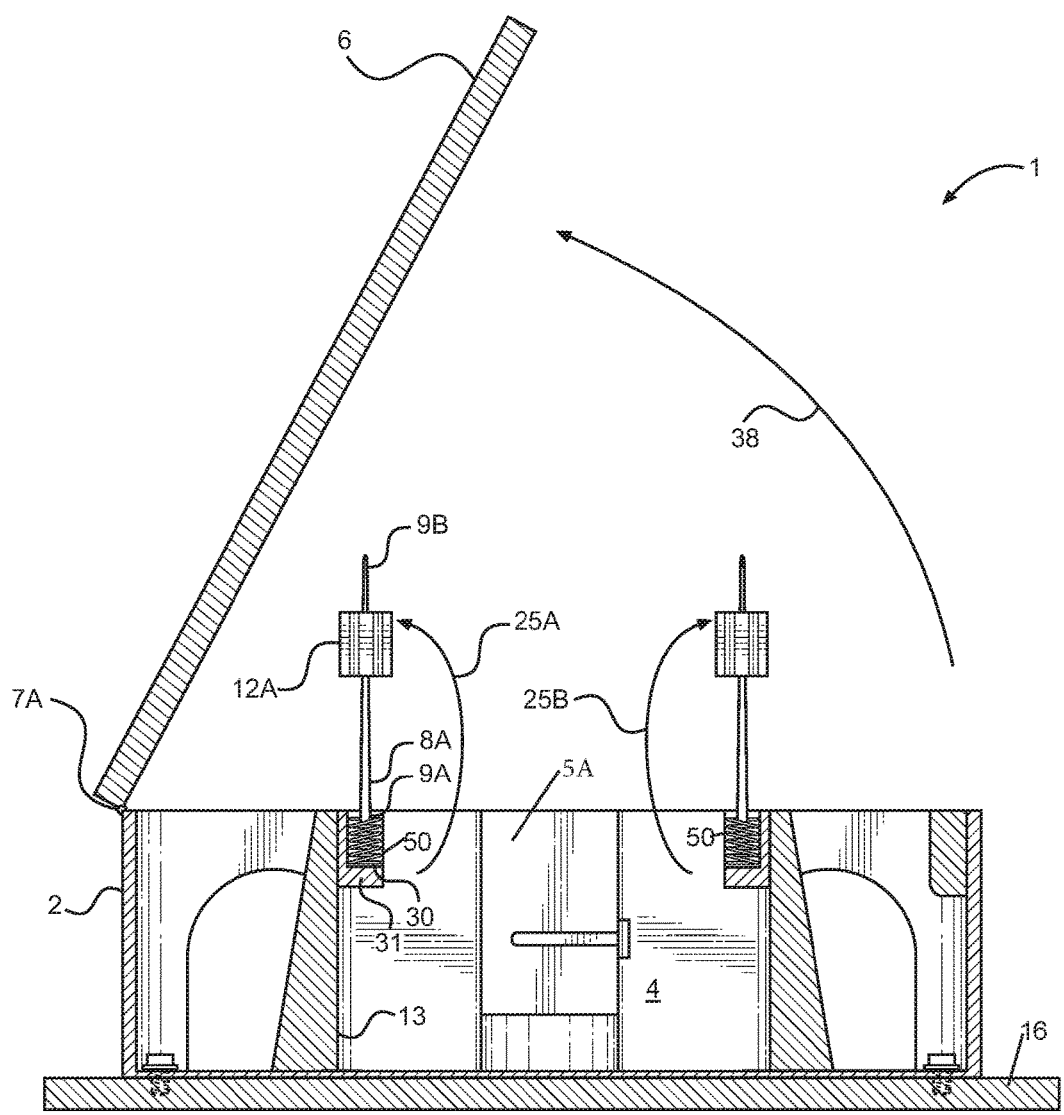
FIG. 8 is a side cut-away view of an alternate embodiment of a bait rod connected to an end of a resilient member being a spring, the spring is retained within a spring housing connected to an inner wall surface of the bait chamber. The bait rod is positioned in a substantially vertical orientation when the lid of the housing is opened.
Figure 9:
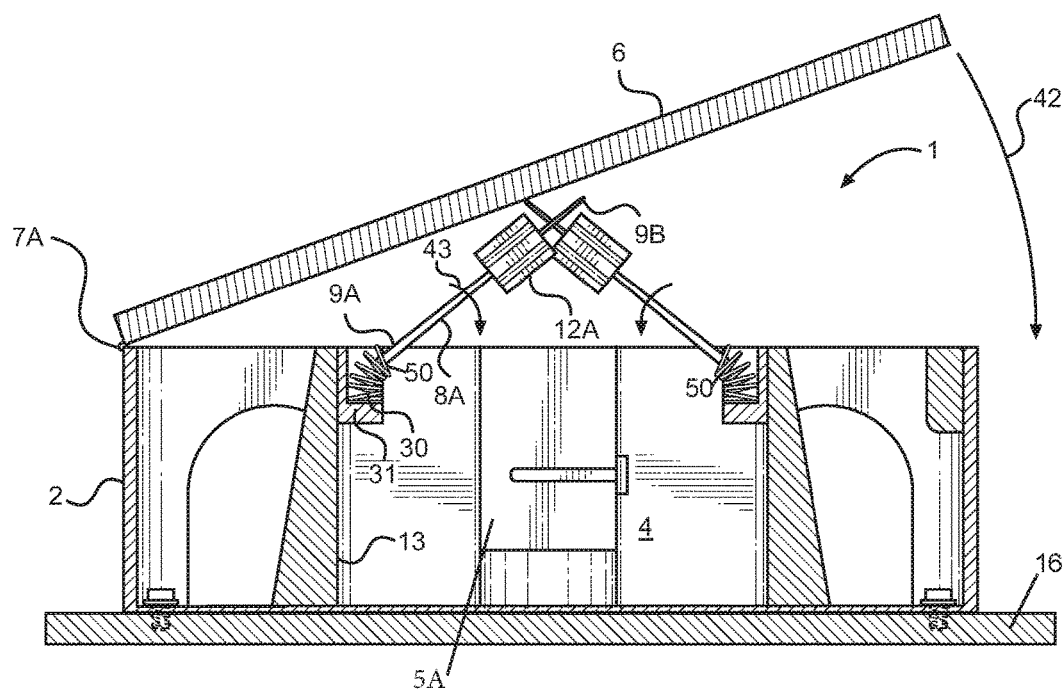
FIG. 9 is a side cut-away view of an alternate embodiment of a bait rod connected to an end of a resilient member being a spring, the spring is retained within a spring housing connected to an inner wall surface of the bait chamber. The bait rod is positioned in a substantially horizontal orientation when the lid of the housing is closed; and, FIG. 10 is a side cut-away view of an alternate embodiment of a bait rod connected to an end of a resilient member being a spring, the spring is retained within a spring housing connected to an inner wall surface of the bait chamber. The bait rod is positioned in a substantially horizontal orientation when the lid of the housing is closed.
Figure 10:
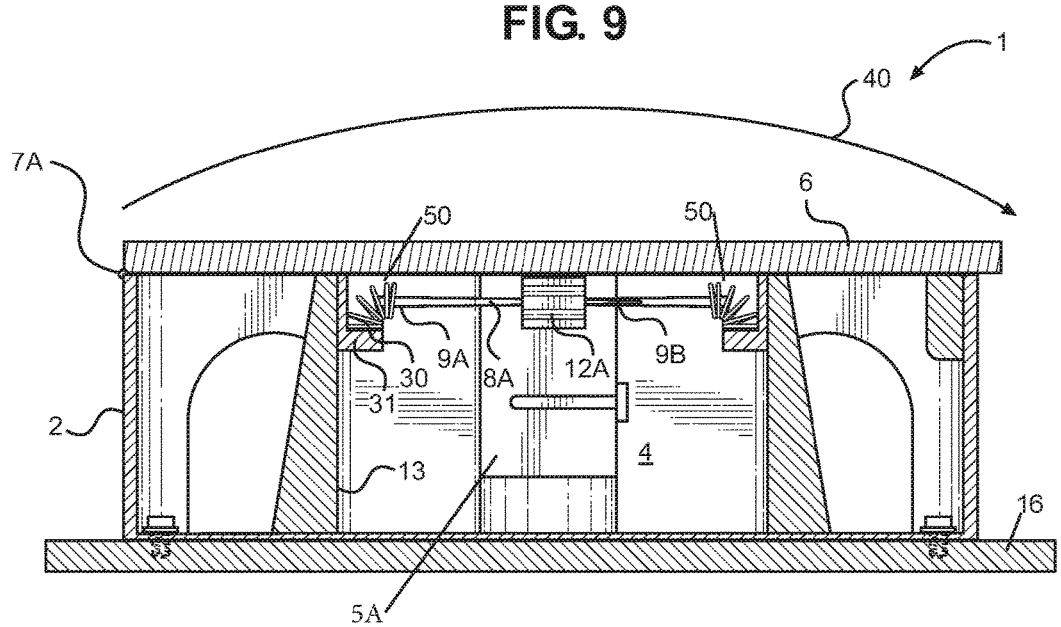

FIGS. 8-10 illustrate novel rodent bait station 1 having housing 2. Bait chamber 4 has inner wall surface 13. Resilient member 30 is retained within housing 31 having opening 50. Resilient member housing 31 is connected to inner wall surface 13 of bait chamber 4. Bait rod 8A has primary end 9A connected with resilient member 30. Bait rod 8A has an end 9B configured to receive bait 12A. FIG. 8 shows lid 6 having an open configuration 38, thereby, orienting bait rod 8A in a substantially vertical orientation 25A. FIG. 9 shows lid 6 closing down on 42 housing 2. For force of the lid 6 on bait 12A or on bait rod 8A orients bait rod 8A toward 43 a substantially horizontal orientation. The bait rod 8A can collapse from a substantially vertical orientation to a substantially horizontal orientation by including, but not limited to, a force of the lid or the lid in communication with a button which releases the bait rod 8A. FIG. 10 illustrates lid 6 of housing 2 in a closed orientation 40. Bait rod 8A is oriented in a substantially horizontal orientation 41 in relation to bait chamber 4.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

The invention claimed is:

1. A rodent bait station having a counting mechanism, comprising:
   a housing, wherein said housing is configured to be fastened to an anchoring surface with a fastener, said housing having at least one opening, said housing having a bait chamber, said bait chamber having at least one bait chamber opening;
   a sensor, wherein said sensor is in communication with said at least one bait chamber opening, whereby, said sensor is configured to detect the presence of a rodent passing through said at least one bait chamber opening of said housing;
   a counting mechanism, said counting mechanism is in communication with said sensor, said counting mechanism is configured to be activated when said sensor detects the presence of a rodent passing through said at least one bait chamber opening of said housing, said counting mechanism is in communication with a database, said database is configured to retain data associated with the number of times said counting mechanism is activated, said database is in electrical communication with an application program, said application program is in electrical communication with an electronic device, whereby, said application program is configured to be monitored by a user through said electronic device;
   a lid, said lid is hingedly connected to said housing;
   at least one bait rod, said at least one bait rod having a first end located opposite a second end, said first end of said at least one bait rod is connected to an inner surface of said housing, said second end of said at least one bait rod is configured to receive a bait; and, a resilient member, said resilient member is in communication with said first end of said at least one bait rod, whereby, said at least one bait rod is positioned in a substantially horizontal orientation when said lid of said housing is closed and said at least one bait rod is positioned in a substantially vertical orientation when said lid of said housing is opened.

2. The rodent bait station having a counting mechanism of claim 1, wherein said second end of said at least one bait rod has a shape capable of piercing through said bait.

3. The rodent bait station having a counting mechanism of claim 1, wherein said sensor of said counting mechanism is electronically activated.

4. The rodent bait station having a counting mechanism of claim 1, wherein said counting mechanism is mechanically actuated.

5. A rodent bait station having a counting mechanism, comprising:
a counting mechanism;
a housing, said housing having a bait chamber, said bait chamber having at least one bait chamber opening;
a lid, said lid is hingedly connected to said housing; and,
at least one bait rod, said at least one bait rod is configured to receive a bait, said at least one bait rod having a first end located opposite a second end, said first end of said at least one bait rod is connected to an inner surface of said bait chamber, said second end of said at least one bait rod is configured to receive said bait, a resilient member is in communication with said first end of said at least one bait rod, whereby, said at least one bait rod is positioned in a substantially horizontal orientation when said lid of said housing is closed and said at least one bait rod is positioned in a substantially vertical orientation when said lid of said housing is opened.

6. The rodent bait station having a counting mechanism of claim 5, wherein said housing is configured to be fastened to an anchoring surface with a fastener.

7. The rodent bait station having a counting mechanism of claim 5, wherein said housing further comprises said counting mechanism connected to a lever, said lever extending from said counting mechanism, said lever protrudes from a wall surface of said housing, said lever is located at said at least one bait chamber opening, whereby, said lever is configured to be depressed by a rodent, whereby, the force of a rodent is applied to said lever when said rodent is entering said bait chamber through said at least one bait chamber opening, thereby, activating said counting mechanism.

8. The rodent bait station having a counting mechanism of claim 5, wherein said second end of said at least one bait rod having a shape capable of piercing through said bait.

* * * * *